US008606224B2

(12) United States Patent
Noldus et al.

(10) Patent No.: US 8,606,224 B2
(45) Date of Patent: Dec. 10, 2013

(54) METHOD AND SYSTEM FOR DELIVERING ADVICE OF CHARGE IN A COMMUNICATIONS SYSTEM

(75) Inventors: Rogier August Caspar Joseph Noldus, BM Goirle (NL); Rakesh Taori, Suwon (KR); Jos den Hartog, SE Capelle a/d Ijssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1130 days.

(21) Appl. No.: 11/915,916

(22) PCT Filed: May 31, 2005

(86) PCT No.: PCT/EP2005/005705
§ 371 (c)(1),
(2), (4) Date: Jan. 4, 2008

(87) PCT Pub. No.: WO2006/128474
PCT Pub. Date: Dec. 7, 2006

(65) Prior Publication Data
US 2008/0153458 A1 Jun. 26, 2008

(51) Int. Cl.
*H04M 11/00* (2006.01)
(52) U.S. Cl.
USPC ........... 455/406; 455/405; 455/407; 455/408; 455/409
(58) Field of Classification Search
USPC .................................. 455/405–409
See application file for complete search history.

(56) References Cited

U.S. PATENT DOCUMENTS

| 5,488,655 | A | 1/1996 | Hamlen | |
|---|---|---|---|---|
| 6,597,903 | B1* | 7/2003 | Dahm et al. | 455/405 |
| 6,977,904 | B2 | 12/2005 | Satoh | |
| 7,006,831 | B2* | 2/2006 | Matz et al. | 455/453 |
| 7,248,855 | B2 | 7/2007 | Joyce | |
| 2002/0102962 | A1* | 8/2002 | Grinn et al. | 455/406 |
| 2002/0156738 | A1* | 10/2002 | Irmler | 705/52 |
| 2004/0110507 | A1* | 6/2004 | Ramakrishnan et al. | 455/445 |
| 2006/0265326 | A1* | 11/2006 | Barrett | 705/40 |

FOREIGN PATENT DOCUMENTS

| CN | 1244995 A | 2/2000 |
|---|---|---|
| EP | 1 073 300 A | 1/2001 |
| JP | A 2003-229852 | 8/2003 |
| JP | A 2004-096265 | 3/2004 |
| JP | A 2004-173398 | 6/2004 |
| WO | WO 97/37503 | * 10/1997 |
| WO | WO 97/37503 A | 10/1997 |
| WO | WO 98/21907 A | 5/1998 |
| WO | WO 98/39937 A | 9/1998 |
| WO | WO98/59504 | 12/1998 |
| WO | WO 99/66706 | * 12/1999 |
| WO | WO 99/66706 A | 12/1999 |
| WO | WO 01/35191 | 5/2004 |

* cited by examiner

*Primary Examiner* — Lester Kincaid
*Assistant Examiner* — Mehmood B Khan

(57) ABSTRACT

A method and system for providing pre-emptive advice of charge messages (201) to users (5b-2) of a communications system (2), via mobile terminals or fixed terminals (5b-2). Each terminal has at least one physical and at least one functional connection in the communications system (2). The pre-emptive advice of charge messages (201) are based on historical usage (203), administrative (202) and operational (205) information in the communications system (2) and are sent to the user without user's request or initiation of the facility or service for which pre-emptive advice of charge is given.

19 Claims, 5 Drawing Sheets

METHOD AND SYSTEM FOR DELIVERING ADVICE OF CHARGE IN A COMMUNICATIONS SYSTEM

FIELD OF THE INVENTION

The present invention relates generally to communications systems, comprising mobile communication terminals and a radio network infrastructure, fixed communication terminals, application nodes and a transport network. More particularly, the present invention facilitates a method and system for delivering advice of charge information to users of services and facilities provided by the communications system.

BACKGROUND OF THE INVENTION

State of the art communications systems comprise a multitude of communication terminals and nodes connected by an interconnecting network. The communications systems provide facilities and services to users of the communications systems via their terminals.

Current communication terminals can have a multitude of physical access possibilities to the interconnecting network via access points. Physical access can be based on a radio link using a radio frequency part of the electromagnetic spectrum such as generally known under the acronyms WLAN, GSM, GPRS, UMTS, DECT, or Bluetooth, or utilise another part of the electromagnetic spectrum like infrared ports. These types of access are commonly identified as wireless or cellular access. Alternative is a fixed line connection, utilising electrical, optical or comparable means for transportation of information. These are generally known under the acronyms like ADSL, SDSL, cable-modem, LAN, ISDN or regular PSTN, and commonly identified as wire-line access.

Communication terminals having only wireless connection as physical access are identified as mobile terminals. Communication terminals having wire-line connections or a combination of wire-line and wireless connections as physical access are further identified as fixed communication terminals. In general, in the present invention, the term Terminal(s) is equally valid for mobile and fixed communication terminals.

In addition to the physical access, a Terminal can have a plurality of functional accesses towards facilities and services provided by the communications system like Switched voice call, IP based voice call, SMS, MMS, internet browsing, e-mail.

The communications system further comprises administration, charging and executing functions. The executing functions actually provide the facilities and services of the communications system. Administration functions register various items like; subscription of users to services and facilities, connection status of user's Terminal functional and physical access, allowable quota for facilities and services, user authentication, Terminal authentication, and passwords. The charging functions in the communications system register the actual usage of facilities and services, translate actual usage in charged amounts and forward charging information to billing systems outside the communication network.

The basis for charging is: billing, charging a prepaid account or charging a credit account. The charging can be subject to a subscription where a subscription fee covers the actual usage of services and facilities in the communications system, or to a subscription where a fee covers only a limited amount of usage of services and facilities in the communications system and where usage beyond the limited amount is charged.

State of the art communications systems comprise multiple parties, which offer services and facilities to users of the communications system. These parties will further be identified as Providers. Providers deliver competing services and facilities. Pricing is a prime item in competition.

For a user of the communications system it has become very difficult to maintain overview of actual cost of a service or facility in the communications system. Regulations currently enforce to some extent that Providers present information on cost of services and facilities before executing the user's request for these services and facilities. This presented information is commonly known as Advice of Charge.

Currently systems and methods are known that provide Advice of Charge. Major drawback of the existing systems and methods is that they act only when a user explicitly requests Advice of Charge, identified as a solicited case, or when a user initiates a request for a facility or service for which then an Advice of Charge is given, identified as an unsolicited case. A user is however not informed when he/she does not explicitly requests advice of charge or initiates a service or facility. In some situations this does not satisfy user interests as shown in the following example.

A user is aware and has used a facility in the communication network that allows the user during a voice communication with another Terminal to send a picture taken with user's Terminal to the other Terminal. The user however uses this facility only in very special occasions as it has a very high price per picture.

A provider of this facility knows that the high price withholds users to actually use the facility. The provider has decided to lower the price and use a charging scheme for the facility that charges half price for first, third, fifth etc. picture and free of charge for second, fourth, etc. picture.

The user, unaware of adapted pricing, rather describes an artefact interested in to his/her call partner, than sending a picture. Would the user have known the new prising the user would have sent a picture, as it is then less costly sending one or two pictures, then describing it in long voice conversation.

Not being aware, the user will not request advice of charge for sending a picture nor initiate this service. A comparable situation exists when the price of sending a picture changes after having sent a predefined number of pictures during a call.

As shown by the example, the user would have appreciated timely information on the new charging. Likewise, there are many other cases where a user would appreciate this.

SUMMARY OF THE INVENTION

The solution provided by the present invention provides a user via his/her terminal with an unsolicited advice of charge for a service or facility in the communications system, without the user initiating a request to use this facility or service.

To this end, the present invention provides a method and arrangement for delivering pre-emptive advice of charge messages to users via their terminals in a communications system comprising:

Executing functions having logical connections to terminals for providing facilities and services to users of those terminals, Administrating functions having logical connections to one or more executing functions for registering information related to allow ability and actual use of facilities and services, Charging functions having logical connections to one or more executing functions for charging actual usage of facilities and services to users of said facilities and services.

The method is characterised by a generation process (600) for pre-emptive advice of charge messages (609) comprising at least the step of Triggering (603) a moment of sending pre-emptive advice of charge messages to users of terminals, based on trigger conditions, and trigger information (608) in the communication system related to the facilities and services provided by the communication system, and An arrangement in accordance with the present invention, characterised in that the communications system further comprises a pre-emptive advice of charge manager, operatively connected by logical connections to the executing, administrating and charging functions, for generating pre-emptive advice of charge messages by executing the above mentioned method, and sending pre-emptive advice of charge messages to the executing functions for forwarding to the terminals, the invention will now be described by way of example in a more detailed manner, with reference to the enclosed drawings.

DETAILED DESCRIPTION OF THE DRAWINGS

Figure 1A:
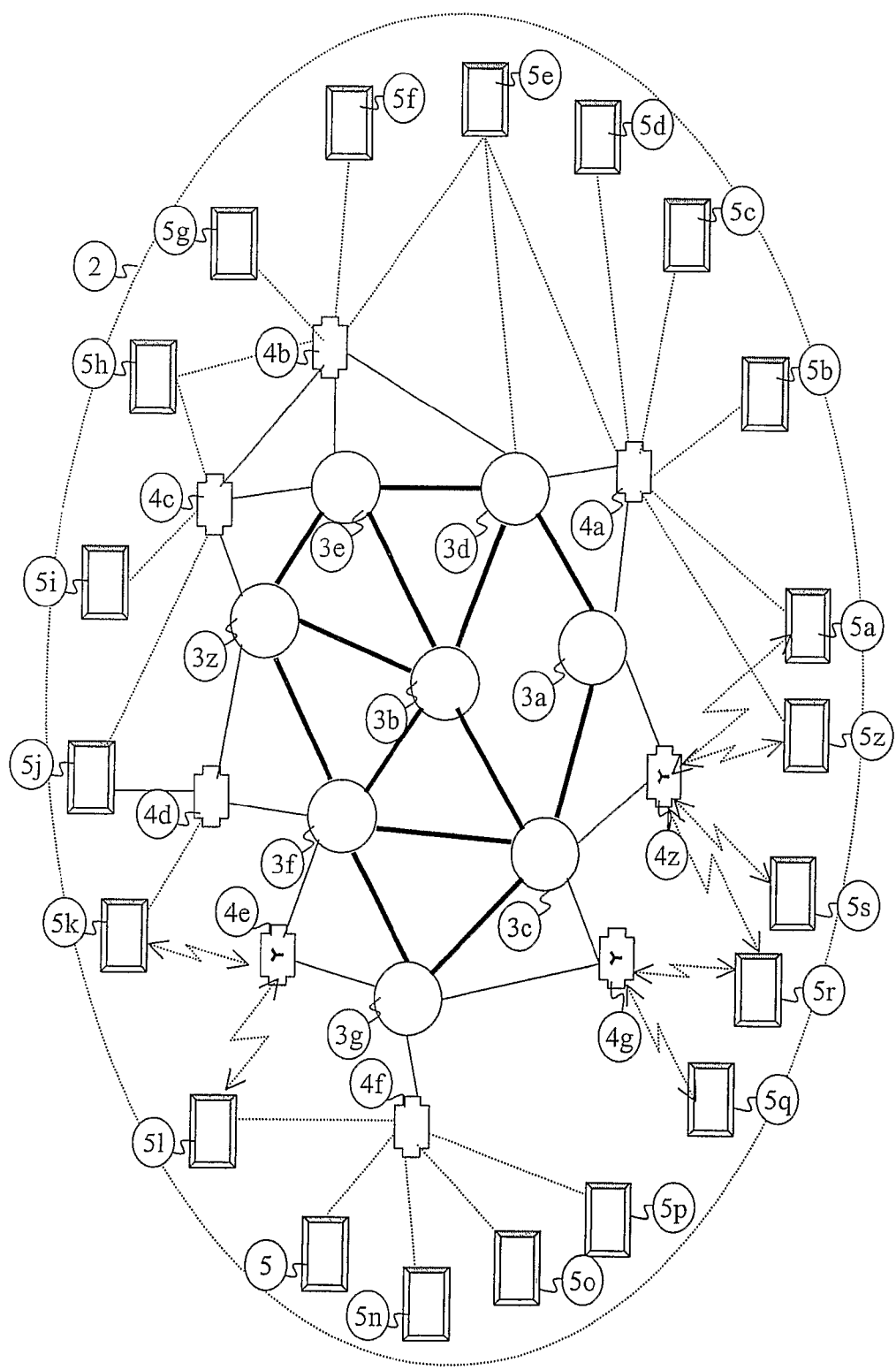
FIG. 1a shows a schematic diagram of a state of the art communications system's physical layer.

FIG. 1a shows a state of the art communications system (2) involving a multitude of Terminals (5a-z) having physical access via access points (4a-z) to the network of interconnected nodes (3a-z). A terminal has at least one physical access to an access point but can have more identical or different physical types of accesses. Physical access can be of a wireless or a wire-line type. Access-points 4e, 4g and 4z provide wireless access, the other access points provide wire-line access.

Figure 1B:
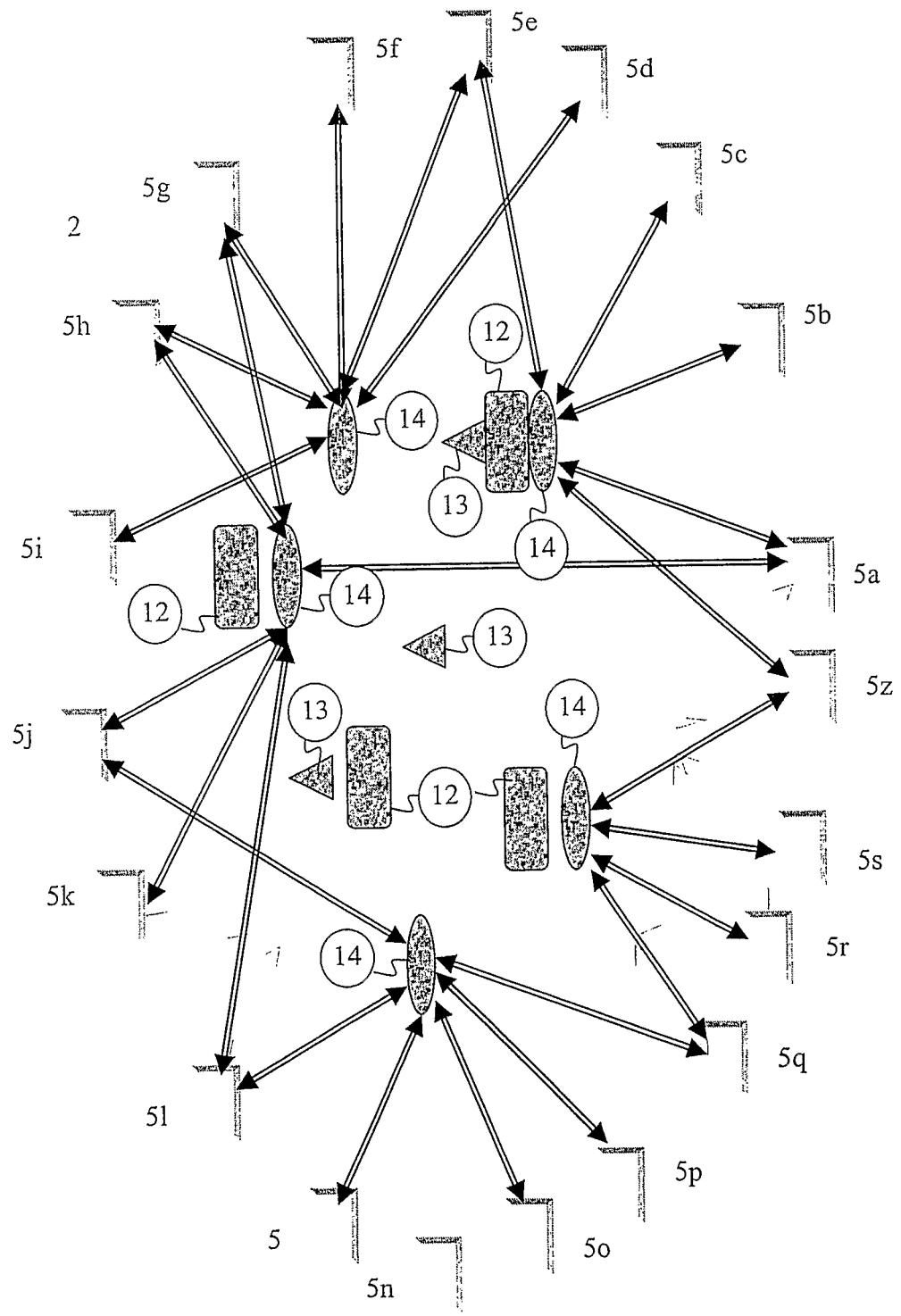
FIG. 1b shows a schematic diagram of a state of the art communications system's functional layer as overlay to the physical layer (shown dotted)

FIG. 1b shows in addition to a communications system's physical layer (shown dotted) as presented in FIG. 1a, a communications system's functional layer. The communications system's functional layer provides facilities and services to users of the communications system via their terminals. Executing functions (identified as 14) having functional connections to the terminals provide the facilities and services. Administrative functions (identified as 12) perform registration actions and charging functions (identified as 13) perform charging actions.

Figure 2:
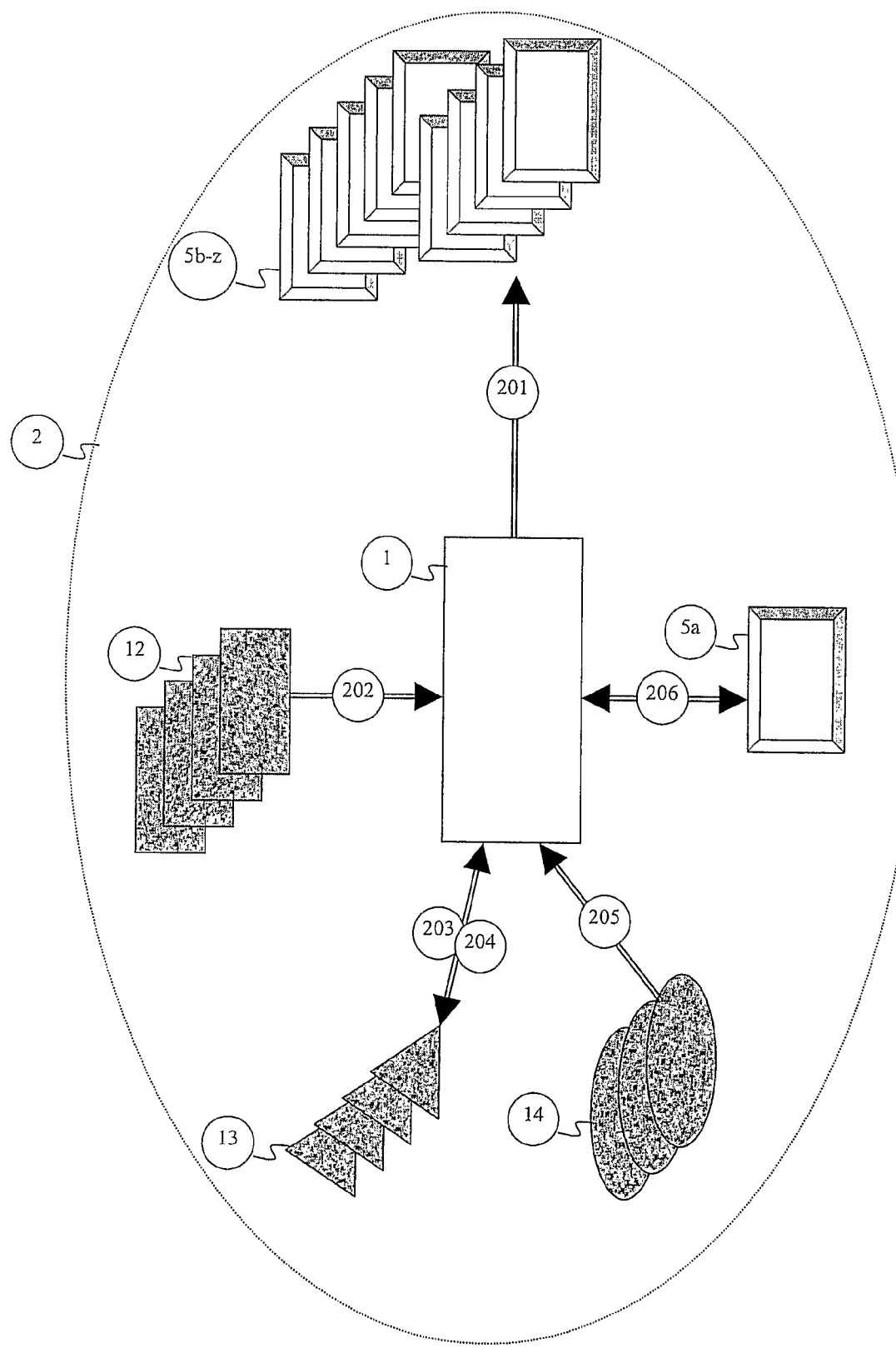
FIG. 2 shows a schematic diagram of communications system including the present invention.

FIG. 2 shows a pre-emptive advice of charge manager (1), further identified with its acronym PACMAN, and its connections (201-206) in the functional layer. PACMAN either runs as computer program product on a designated node in the network, is a designated node in the network, runs as computer program product distributed on several nodes in the network or is a complex of designated nodes and related equipment in the network. The output of PACMAN is pre-emptive advice of charge messages (201) to users of the communications system via terminals in the communications systems. Pre-emptive advice-of-charge messages are unsolicited advice of charge messages, for which a user did not initiate a facility or service. Pre-emptive advice of charge messages will, for the remainder of this disclosure, be referenced by their short notation PAC messages.

A PAC message to a user is dedicated to the user's actual and historical usage of facilities and services, administrative information regarding his terminal, administrative information regarding the users subscription to facilities and services, and triggering information reflecting current usage of facilities and services. The PAC message is of a certain message type, meaning it is dedicated for a certain functional connection like SMS, voice, MMS, or http. PAC messages have a fixed part commonly sent to several terminals and an optional flexible part containing the dedicated information as outlined above.

Administrative information (202) is provided by the various administrative functions (12) in the communications system. Administrative information comprises but is not limited to; user (terminal) status, capabilities of functional access type the user/terminal has, connection status of these functional access types, user registration/subscription for certain services, type of payment. Administrative information can be acquired by PACMAN or sent by each administrative function and stored by PACMAN.

Charging information is provided by the various charging functions (13) in the communications system. Charging information comprises charging records (203) relating to actual usage of facilities and services, sent by each charging function to PACMAN. PACMAN stores charging records in an internal database to serve as historical usage information of services and facilities. Charging information further comprises advice of charge (204) provided on request of PACMAN for a possible and not yet initiated future use of a service or facility. PACMAN enters provided information into the PAC message to the user.

Triggering information (205) is provided by the various executing functions (14) in the communications system. The triggering information is sent by the executing functions to PACMAN. Triggering information comprises but is not limited to; Terminal switched on/off, access type (physical or functional) activation/deactivation, started/ended usage of facility or service, relative time limit related to duration of using facility or service, relative volume in using facilities or services in time frame (like amount in bundle), absolute volume in using facilities or service (like passing low cost storage limit), absolute time/date of telecom system, absolute time/date of terminal time zone.

An operator controls PACMAN via a functional connection to a terminal (here 5a as example) in the communications system. This control connection (206) allows the operator to control PACMAN by means of interactive sessions. Access to PACMAN requires both terminal and user authentication.

Figure 6:
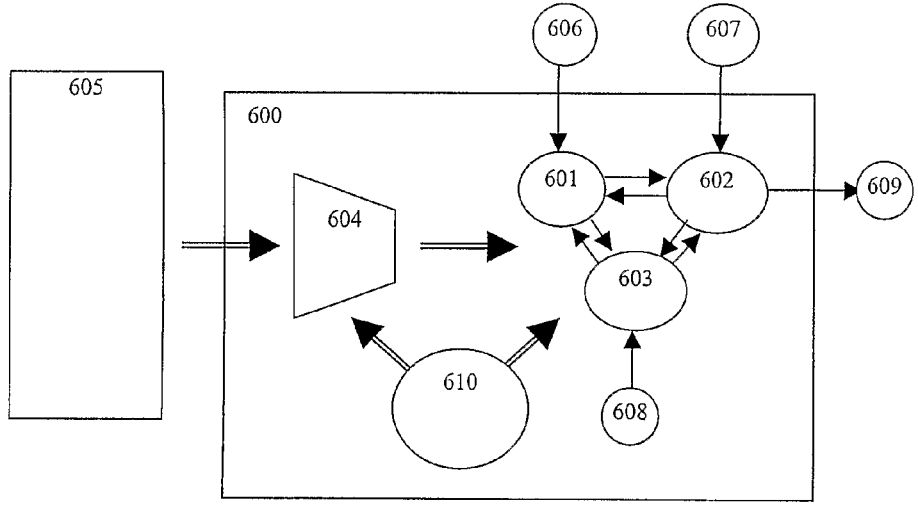
FIG. 6 shows a schematic diagram of the method of providing pre-emptive advice of charge messages.

FIG. 6 shows the basic operation of PACMAN. Generation of PAC messages (609) is done in a generation process (600) having 3 basic steps (601,602,603), which can be executed in any sequence. The steps are controlled by rules (610) defining contents of the PAC messages, conditions when it is applicable as well as conditions when it shall be sent. A plurality of such rules is contained in a rule database in PACMAN. Each of these rules requires constantly checking of all terminals in the communications system against the conditions stated in the rule. Today's communications systems comprise millions of terminals. Together with thousands of possible rules it would give massive requirements for computing power, being able to produce the PAC message on the wanted moment. It is therefore that a pre-scanning (604) takes place.

Pre-scanning checks whether a rule is applicable for a terminal from all terminals (605) in the communications system. If a rule/terminal combination passes pre-scanning, then a rule/terminal identifier pair is active in the aforementioned generation process (600). Pre-scanning uses some conditions contained in the rule (610); these conditions relate to administrative aspects of a terminal and do not change frequently. Examples are terminal status, status and availability of physical and functional access, subscription to certain services and facilities.

In order to further improve pre-scanning performance, pre-scanning does not constantly check all terminals (605) but only when there is a change in the administrative information of a terminal. When a change in the administrative information of a terminal occurs, pre-scanning checks the terminal against all rules. Likewise when there is a new or changed rule, pre-scanning checks all terminals against that rule.

Additional performance improvement of the pre-scanner is achieved by not acting on deletion of a rule as this would also mean that the pre-scanner has to recall rule/terminal identifier pairs in the generation process. Instead the generation process detects the absence of a rule when accessing it for information and acts accordingly.

Additional performance in the generation process is gained by time stamping rule/terminal identifier pairs activated in the generation process. This save-guards that rule/terminal combinations will not stay indefinitely in the generation process. When a validity period, as stated in the rule, has passed, the generation process deletes the rule/terminal identifier pair. Likewise the generation process deletes the rule/terminal identifier pair when the PAC message has been sent or the rule is deleted.

In all cases pre-scanning is informed of the deletion of a rule/terminal identifier pair. Pre-scanning then checks that rule/terminal combination again and if the rule still exists and conditions are still met, pre-scanning re-activates the rule/terminal identifier pair in the generation process.

The generation process (600) comprises selection, triggering and generation, which will be described now in more detail.

In selection (601) a detailed check is performed whether the rule is applicable based on historical usage of facilities and services, and administrative details that are frequently changing so they were not taken into account in pre-scanning (606). Selection takes the conditions to apply from the rule applicable. When the rule no longer exists, or the conditions in the rule are not met, or the validity period of the rule has passed, then selection deletes the rule/terminal identifier pair. When conditions are met, the rule/terminal identifier pair is handed over to one of the other steps.

In triggering (603), the exact moment is determined when the PAC message shall be sent to the terminal. Triggering maintains for that purpose an internal table with rule/terminal identifier pairs. It reads trigger information (608) belonging to the terminals and compares it with a trigger condition provided by the rules. Triggering continuously scans all rule/terminal combinations for meeting trigger conditions. If a rule/terminal combination meets the trigger conditions, the corresponding rule/terminal identifier pair is removed from the scanning process and forwarded to one of the other steps. If the rule for a rule/terminal combination is no longer existing or when validity period of the rule has passed, the rule/terminal identifier pair is deleted.

In assembling (602) the actual message is prepared. Type of message and fixed contents are defined in the rule. The variable content of the message is obtained from charging functions. Assembling therefore places a request specifying a possible future event for which the charging functions reply with a normal advice of charge message (607). Using the actual charging functions for advice of charge has the advantage that no mismatch can occur, which would be possible when an algorithm would be contained in the rule. After a PAC message is assembled, it is temporarily stored in a waiting message buffer, including the rule/terminal identifier pair.

Above 3 steps can be executed in any sequence allowing for optimising. One example is optimising for a moment when the message is delivered where triggering is the last step to be executed. Another example is when optimising for the latest usage information and best pre-emptive advice of charge where assembling is the last step. Selecting can also be the last step when one of the selection conditions is factually the trigger to send the message.

The last step in the generation process does not forward the rule/terminal identifier pair to a next step, but releases the message from the waiting message buffer. Additionally the last step also deletes the rule/terminal identifier pair from the generation process. Deleting the rule/terminal identifier pair also results in deletion of any waiting PAC message having the same rule/terminal identifier pair. Advantageously this also implies that when a rule/terminal identifier pair is deleted without a release of a PAC message, the message is deleted too, ensuring that no obsolete messages are kept in the waiting message buffer.

Figure 3:
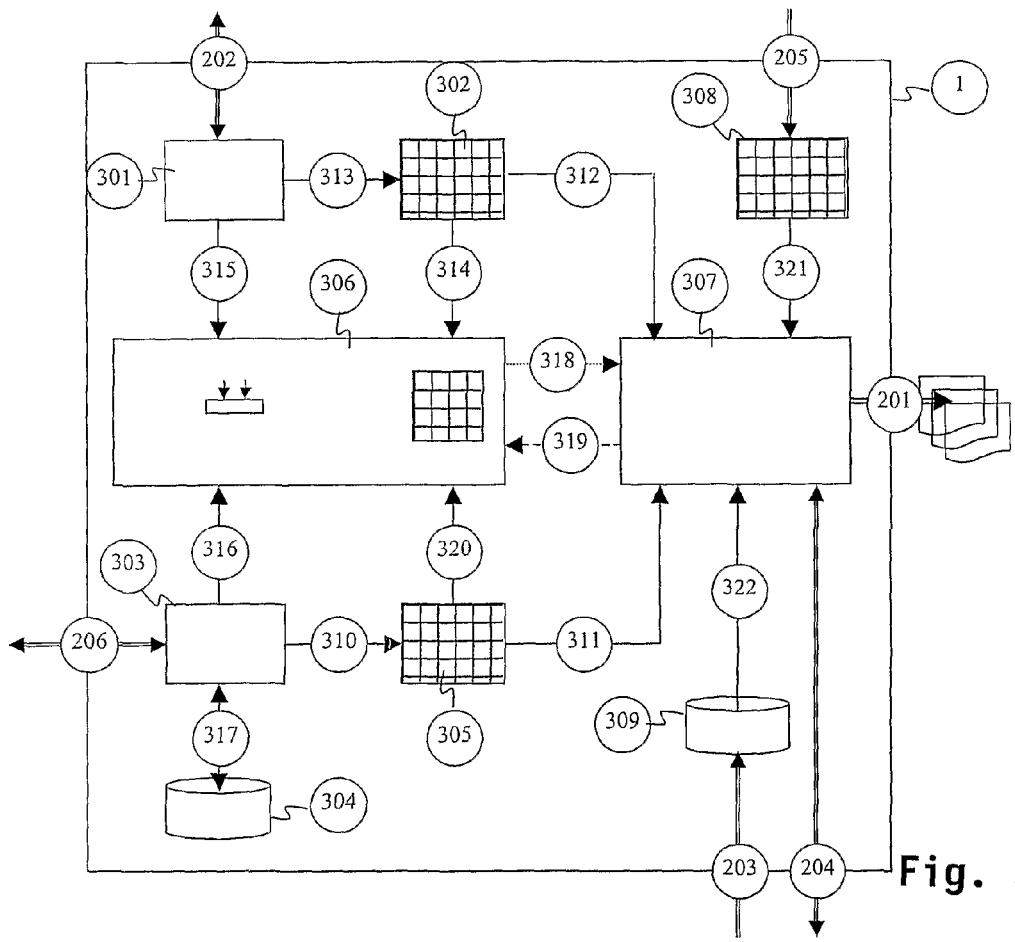
FIG. 3 shows a schematic diagram of the pre-emptive advice of charge manager.

In FIG. 3 an embodiment is shown of PACMAN. PACMAN operations are controlled by a set of rules contained in a rule database (304), each rule having a unique identifier. A rule manager (303) maintains the set of rules. As a rule does not need to be indefinitely valid and can be made in advance, it has a start and an end date/time for being active. The rule manager scans the database and checks the start and end date/time of each rule. When a rule becomes active (start date/time has passed), the rule manager copies (310) the rule to an active rule table (305). When copying the rule manager ignores administrative data not required for PACMAN operation. The rule manager also modifies the optimising parameter in the rule into a process indicator, which determines in which sequence the steps in the generation process will be executed. This allows optimising for the purpose of the message. In the same time it informs (316) the pre-scanner (306) of the rule, which became active, by means of the unique identification of the rule. When end date/time has passed the rule manager removes the rule from the active rule table.

The rule manager also controls functional interface (206) towards an operator who can control PACMAN operations via a terminal in the communications system. The rule manager takes care of terminal and user authentication and provides an interactive session where the operator can add, delete or edit rules.

Fundamental in PACMAN operation is that pre-emptive advice of charge messages are sent to terminals. Terminals taken into consideration are maintained in an active terminal table (302). Each table entry contains a unique terminal identification and administrative details. A terminal administrator (301) enters or deletes terminals from the table (313) based on the operational availability of the terminal like switched on or in reach of wireless access points. The terminal administrator receives (202) administrative information from various administrative functions in the communications system and stores it (313) in the active terminal table. When the terminal administrator enters a new terminal into the active terminal table or the stored administrative information changes, the unique terminal identification (315) is also provided to the pre-scanner.

Figure 5:
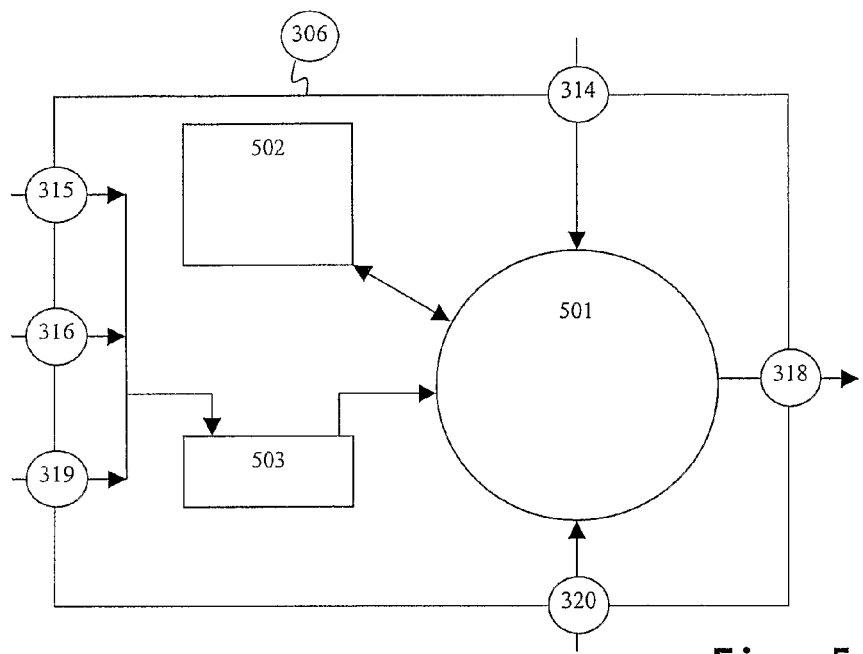
FIG. 5 shows a schematic diagram of a pre-scanner.

The pre-scanner (306) is shown in more detail in FIG. 5. Controlling input for the pre-scanner is provided by:
- The rule manager, by means of unique identifications of new activated rule (316),
- The terminal administrator, by means of unique terminal identifications (315) for new terminals or terminals whose administrative data has changed, or
- Rule/terminal identifier pairs (319) that have been deleted in the generation process.

All of this input is entered in a single FIF0 (503). A controller (501) reads input from the FIF0. For its own administration the pre-scanner maintains an activated rule/terminal identifier table (502) of rule/terminal identifier pairs activated in the generation process (318). The controller (501) processes input from the FIF0 (503) depending on the type of input.

If the input from the FIF0 is a unique identifier of a new activated rule the controller starts scanning all terminals as contained in the active terminal table (302) one by one, to determine whether they are applicable for that rule. It therefore first retrieves the rule (320) from the active rule table (305). It then reads (314) the administrative information of a first terminal and compares this administrative information to the pre-conditions contained in the rule.

If the administrative information complies with the pre-conditions, the controller writes a rule/terminal identifier pair in the activated rule/terminal identifier table (502). It also sends (318) the rule/terminal identifier pair including a time-stamp and the process indicator contained in the rule to the generation process. If the rule/terminal identifier pair already existed in the table (502) no actions are taken and the controller reads the next input from the FIF0. It is so prevented that multiple entries of a rule terminal pair are activated in the generation process.

After this step or in the case of non-compliance the controller reads administrative information of a next terminal and checks compliance. This process continues until all terminals in the active terminal table are checked.

If the input from the FIF0 is a unique identifier of a terminal whose administrative information has changed or is new in the active terminal table, the controller will check the administrative information of that terminal against all active rules as contained in the active rule table (305). It therefore first reads (314) the administrative information for the terminal from the active terminal table (302). It then reads (320) the first rule from the active rule table and checks compliance of the administrative information to the preconditions stated in the rule.

If the administrative information complies with the pre-conditions, the controller writes a rule/terminal identifier pair in the activated rule/terminal identifier table (502). It also sends (318) the rule/terminal identifier pair including a time-stamp and the process indicator contained in the rule for activation in the generation process. If the rule/terminal identifier pair already existed in the table (502) no actions are taken.

After this step or in the case of non-compliance it reads a next rule and checks compliance. This continues till all rules in the active rule table are checked.

If the input from the FIF0 is a rule/terminal identifier pair deleted in the generation process (319) the controller firstly deletes the rule/terminal identifier pair from the activated rule/terminal identifier table (502). It then reads the administrative information of that terminal (314) and reads that rule (320). The controller checks whether administrative information complies with pre-conditions stated in that rule.

If the administrative information complies with pre-conditions stated in the rule, the controller writes the rule/terminal identifier back to table (502) and sends the rule/terminal identifier including time-stamp and the process indicator contained in the rule to the generation process. If the administrative information does not comply with the pre-conditions stated in the rule, the controller takes no further actions.

Figure 4:
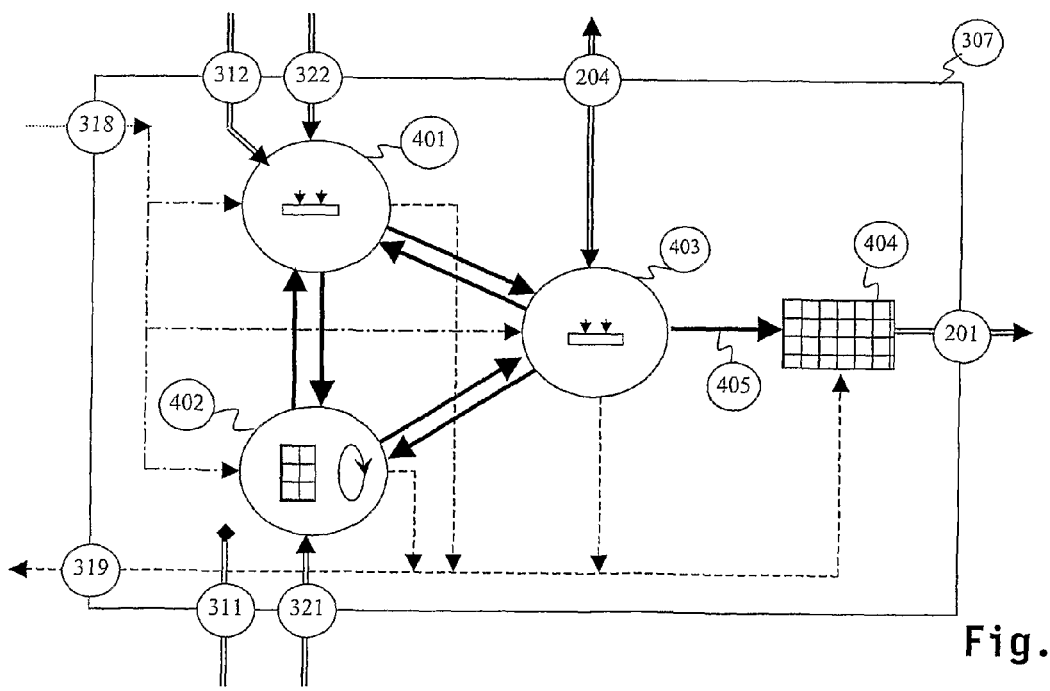
FIG. 4 shows a schematic diagram of a message generator.

Apart from pre-scanning, the generation process is executed in a message generator (307). FIG. 4 gives a detailed view of the message generator. The message generator comprises 4 functions: a selector (401) executing the selection step, a trigger (402) executing the triggering step, an assembler (403) executing the assembling step and a waiting message buffer (404) for temporarily storage of messages to be sent.

The message generator is controlled by the input it receives (318) from the pre-scanner (306). This input comprises rule/terminal identifier pairs with a time-stamp and a process indicator. The input is provided to selector, trigger and assembler, but each rule/terminal identifier pair is accepted by only one of them based on the value of the process indicator. Selector, trigger and assembler require information contained in rule. They read (311) the information from the active rule table (305).

In addition each of them requires specific information for performing its function. The assembler provides requests for and receives (204) advice of charge from the charging functions (13) in the communications system. The request is made for a possible future event. The details and definition of required information for the request is contained in the rule.

The selector requires information partly available in the active terminal table, and for the other part consists of historical usage of facilities and services. The information from the active terminal table is read directly (312). The historical usage information is retrieved from an events database (309) maintained by PACMAN. Charging functions (13) send (203) charging records for usage of facilities or services to PACMAN, which are pre-processed and stored in the events database.

The trigger requires actual operational status information. This information is provided (205) by the various executing functions (14) in the communications system. PACMAN maintains a trigger table (308) organised per terminal to store information for synchronisation. Trigger reads (321) this information from the table.

Output of the message generator are PAC messages (201) forwarded to the executing functions in the communications system, depending on the type of message. The executing functions take care of transport to the terminals.

Rule/terminal identifier pairs received from trigger, assembler or pre-scanner, control the operation of the selector. The selector has an internal FIF0 for incoming rule/terminal identifier pairs. When a rule/terminal identifier pairs comes from the pre-scanner, it is only entered into the FIF0 when its process identifier has a value 3 or 4. The selector retrieves the rule/terminal identifier pairs one by one from the FIF0 and processes them.

For a rule/terminal identifier pair the selector reads the corresponding rule from the active rule table, and retrieves the administrative information of the terminal from the active terminal table. In a first comparison check the selector checks whether administrative information complies with selector conditions in the rule. If compliant the selector starts the second check. It therefore queries the event database. The query results are checked for compliance to the selector conditions in the rule.

If the first comparison check fails, the selector sends a "delete Rule/terminal identifier pair" instruction and takes no further action. If the second comparison check fails the same action is taken. Only when both comparison checks pass, the selector takes further action depending on the value of the process indicator of the rule/terminal identifier pair.

- If it was 1 or 3, the selector forwards the rule/terminal identifier pair to the assembler.
- If it was 2 or 5 the selector sends a "send rule/terminal identifier pair" instruction and after that a "delete rule/terminal identifier pair" instruction.
- If it was 4 or 6, the selector forwards the rule/terminal identifier pair to the trigger.

Like the selector, rule/terminal identifier pairs received from pre-scanner, selector or assembler control the trigger. Unlike the selector, trigger has no FIF0 but stores received rule/terminal identifier pairs in an internal table. When a rule/terminal identifier pair is received from the pre-scanner the process indicator is checked. Only rule/terminal identifier pairs with process indicator value 1 or 2 are stored. The internal table is sorted on terminal identifier and then on process identifier. For improved performance the table actually contains 2 sections one containing the rule/terminal identifier pairs and one containing a list of applicable rules sorted on rule identifier.

The trigger operates in scan cycles. In one scan cycle it checks all rule/terminal identifier pairs in the table for compliance to trigger conditions in the rule. The very frequent retrieval of rules would however interfere with other functions in PACMAN that require rule information from the active rule table. The trigger therefore starts a scan cycle by retrieving applicable rules. Portions of the rules relevant for trigger operation are stored internally.

In a first pass of the scan cycle each rule/terminal identifier pair is checked on expiry of the validity period. If the validity period of a rule/terminal identifier pair has expired, the rule/terminal identifier pair is removed from the internal table and a "delete rule/terminal identifier pair" instruction is sent. If it is found that there is no longer a valid rule for the rule/terminal identifier pair, the same actions are taken.

In a second pass of the scan cycle, the trigger fetches for the first terminal, for which a rule/terminal identifier pair exists in the internal table, the trigger information from the trigger table and compares it to the trigger conditions in all rules, provided that for that rule a corresponding rule/terminal identifier pair exists in the internal table. It then fetches the trigger information for the next terminal in the internal table and compares the trigger information with the trigger conditions of the rules, as described above. This process continues until all terminals in the list have been checked against the rules. The outcome of each check can be:

- If the trigger information does not comply with the trigger condition in a rule, no further action is taken.
- If the trigger information does comply with the trigger condition in a rule, further action depends on the value of the process indicator of the rule/terminal identifier pair.
- If it was 1 or 5, trigger forwards the rule/terminal identifier pair to the selector.
- If it was 3 or 6 trigger sends a "send rule/terminal identifier pair" instruction and after that a "delete rule/terminal identifier pair" instruction.
- If it was 2 or 4, trigger forwards the rule/terminal identifier pair to the assembler.

In all 3 cases trigger deletes also the rule/terminal identifier pair from its internal table Like the selector also the assembler acts on messages in an internal FIF0 received from pre-scanning, trigger or selector. If received from the pre-scanner, rule/terminal identifier pairs are only accepted into the internal FIF0, when the process type identifier has a value 5 or 6.

When the assembler reads a rule/terminal identifier pair from the FIF0 it start by reading the corresponding rule from the active rule table. If that rule is no longer in the active rule table, the assembler sends a "delete rule/terminal identifier pair" instruction and performs no further actions for this rule/terminal identifier pair.

When a valid rule is obtained, the assembler prepares a message body according to the definition of the rule taking into account the type of message, terminal administrative data and the fixed part of the PAC message. If a charging rule is defined, the assembler gathers required data and forwards it to the charging function in the network for advice of charge. When the advice of charge is received back from the charging function, the assembler integrates the advice of charge in the PAC message.

The PAC message is then temporarily stored in the waiting message buffer together with its rule/terminal identifier pair. The PAC message is released when the waiting message buffer receives a matching "send rule/terminal identifier pair" instruction. The message is deleted from the buffer when a matching "delete rule/terminal identifier pair" instruction is received.

After storing the PAC message, the remaining actions for the rule/terminal identifier pair depend on the value of the process indicator of the rule/terminal identifier pair.

- If it was 2 or 6, assembler forwards the rule/terminal identifier pair to the Selector.
- If it was 1 or 4 assembler sends a "send rule/terminal identifier pair" instruction and after that a "delete rule/terminal identifier pair" instruction.
- If it was 3 or 5, assembler forwards the rule/terminal identifier pair to the trigger.

Figure 7:
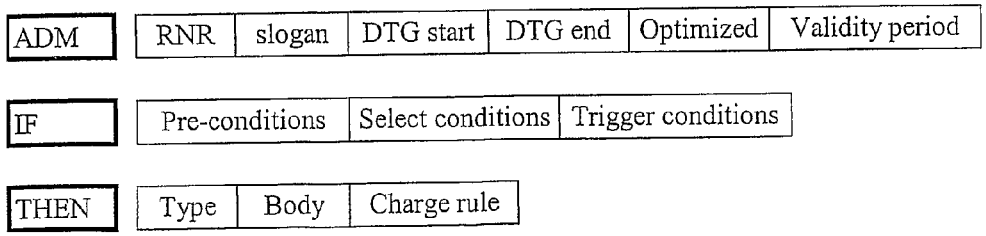
FIG. 7 gives an overview of the elements of a rule for generating pre-emptive advice of charge messages.

Although the contents and function of rules is already described in detail, FIG. 7 gives an overview of the contents of a rule for reference. A rule comprises 3 parts: an administrative section (ADM), a condition section (IF), and a message definition section (THEN).

The administrative section (ADM) comprises the following fields:

- RNR: Rule number, providing a unique identifier for the rule,
- Slogan: Text string identifying the rule for recognition of its purpose,
- DTG start: Date/Time group for activation of the rule,
- DTG end: Date/Time group for deactivation of the rule,
- Optimised: indication of optimisation sought in generation in light of the purpose of the rule.
- Validity period: specifying a maximum duration that a rule/terminal combination may be present in the generation process.

When the rule is activated and copied into the active rule table, the fields Slogan, DTG start and DTG end are deleted. Optimised is replaced by a process indicator, value 1-6, that determines the sequence in which the steps in the generation process shall be executed.

The condition section (IF) comprises the following fields:

- Pre-conditions: identifying conditions to be checked by the pre-scanner, if a PAC message can be sent for this rule/terminal combination, Select conditions: conditions used by selection step in the generation process, whether a PAC message shall be sent for this rule/terminal combination, Trigger conditions: conditions that are used by the triggering to determine the moment when a PAC message shall be sent.

The condition section is copied on activation of the rule as is to the active rule table.

The message definition section (THEN) comprises the following fields:

Type: defining a functional connection to be used for sending a PAC message like SMS, MMS, http or voice.

Body: defining the fixed contents of a PAC message as a link to a file where the fixed part is stored.

Charge rule: defining where and how to obtain the flexible part of a PAC message.

The message definition section is copied as is, when the rule is activated. The Charge rule field is optional and may be omitted when no flexible part is required. The file identified in the Body field can include special reference to where the flexible part is to be included. If omitted the flexible part will follow immediately after the fixed part.

The embodiment described for the present invention, is only one possible way of implementing the invention, enabling a person skilled in the art to appreciate the teachings.

The invention claimed is:

1. A method for delivering service related preemptive advice of charge, said method comprising:
generating pre-emptive advice of charge messages;
selecting terminals from a plurality of terminals for delivering said pre-emptive advice of charge messages using rules;
controlling content, conditions for applicability and conditions for delivery of said pre-emptive advice of charge messages with said rules; and
sending from a designated node or group of nodes, said pre-emptive advice of charge messages to said selected terminals,
wherein selecting said terminals comprises:
pre-scanning at least some of said plurality of terminals for verifying applicability of said rules, said pre-scanning being limited to those of said plurality of terminals for which administrative information changes, and said pre-scanning being performed upon changing of said administrative information;
after said pre-scanning, activating terminal-rule identifier combinations related to terminal and rule combinations for which said rules apply to said terminals for which administrative information has changed; and
from the terminals for which a terminal-rule identifier combination is activated, selecting terminals for which trigger information associated with each terminal meets trigger conditions; and
determining a moment, based on said trigger conditions and trigger information, for performing said sending said pre-emptive advice messages to said selected terminals;
wherein said rules comprise select conditions, and the trigger conditions for generating said preemptive advice of charge messages, wherein said select conditions comprise preconditions for performing said pre-scanning.

2. The method according to claim 1, wherein said one or more terminals for which administrative information has changed comprises new terminals registered in said communications system, and existing terminals in said network for which said administrative information has changed.

3. The method according to claim 1, further comprising a step of repeating said step of pre-scanning for a deleted terminal rule combination after deletion of said terminal-rule identifier combination.

4. The method according to claim 1, comprising a step of changing at least one of said rules, wherein said step of pre-scanning is performed after said at least one of said rules has changed.

5. The method according to claim 1, further comprising a step of defining said rules.

6. The method according to claim 1 wherein said rule further comprises at least one of a group comprising a rule validity period for which said selection rule is to be maintained, a combination validity period for which a terminal-rule identifier combination may reside in said communications system, a message type of said messages, a fixed message part, and a user dependent message part for including user dependent data in said message.

7. The method according to claim 5, wherein said step of pre-scanning is performed after a new rule has been defined.

8. The method according to claim 1, wherein said administrative information comprises at least one of a group comprising terminal status, capabilities of functional access types available to said terminal, connection status of said functional access types, terminal subscription information related to services provided in said communications system, and type of payment.

9. An apparatus for delivering service related preemptive advice of charge, the apparatus comprising:
a processor coupled to a memory storing instructions that, when executed by the processor cause the apparatus to perform the steps of:
generating pre-emptive advice of charge messages;
selecting terminals from a plurality of terminals for delivering said pre-emotive advice of charge messages using rules;
controlling content, conditions for applicability and conditions for delivery of said pre-emptive advice of charge messages with said rules;
sending said pre-emptive advice of charge messages to said selected terminals;
wherein selecting said terminals comprises:
pre-scanning at least some of said plurality of terminals for verifying applicability of one or more said selection rules, said step of pre-scanning being performed on only those of said plurality of terminals for which administrative information;
activating, after said step of pre-scanning, terminal-rule identifier combinations related to terminal and rule combinations for which said rules apply to said terminals for which administrative information has changed; and
from the terminals for which a terminal-rule identifier combination is activated, selecting terminals for which trigger information associated with each terminal meets trigger conditions; and
determining a moment, based on said trigger conditions and trigger information, for sending pre-emptive advice messages to said selected terminals,
wherein said rules comprise select conditions and the trigger conditions for generating said preemptive advice of charge messages, wherein said select conditions comprise preconditions for performing said pre-scanning.

10. The apparatus according to claim 9, wherein said one more terminals on which pre-scanning is performed comprises new terminals registered in said communications system and existing terminals in said network for which said administrative information has changed.

11. The apparatus according to claim 9, wherein said instructions further cause the apparatus to perform said step of pre-scanning again for a deleted terminal-rule identifier combination after deletion of said terminal-rule identifier combination.

12. The apparatus according to claim 9, wherein said instructions further cause the apparatus to perform the step of defining said rules.

13. A system for delivering service related preemptive advice of charge messages, said system comprising:
a processor coupled to a memory storing instructions that, when executed by the processor cause the system to perform the steps of:
generating said messages;
selecting terminals from a plurality of terminals for delivering said pre-emptive advice of charge messages using rules;
controlling content, conditions for applicability and conditions for delivery of said pre-emptive advice of charge messages with said rules;
sending said pre-emptive advice of charge messages to said selected terminals based on trigger conditions and trigger information;
triggering means, wherein, based trigger conditions and trigger information, said means for sending messages to said terminals is triggered;
wherein selecting said terminals comprises:
verifying applicability of said rules for only those of said terminals for which administrative information changes; and
upon changing of said administrative information, activating terminal-rule identifier combinations related to terminal and rule combinations for which said rules applies to said terminals for which administrative information has changed; and
from the terminals for which a terminal-rule identifier combination is activated, selecting terminals for which trigger information associated with each terminal meets trigger conditions,
wherein said rules comprise select conditions and the trigger conditions for generating said preemptive advice of charge messages, wherein said select conditions comprise preconditions for performing said rule applicability verification.

14. The system according to claim 13, wherein said terminals for which administrative information has changed comprise new terminals registered in said communications system and existing terminals in said network for which said administrative information has changed.

15. The system according to claim 13, wherein said instructions further cause the system to repeat said step of verifying applicability of said rules for a deleted terminal rule identifier combination after deletion of said terminal-rule identifier combination.

16. The system according to claim 13, wherein said instructions further cause the system to perform the step of changing at least one of said rules, wherein said step of verifying applicability of said rules is performed after said at least one of said rules has changed.

17. The system according to claim 13 wherein said instructions further cause the apparatus to perform the step of defining said rules.

18. The system according to claim 13, wherein said administrative information further comprises at least one of a group comprising a rule validity period for which said selection rule is to be maintained, a combination validity period for which a terminal-rule identifier combination may reside in said communications system, a message type of said messages, a fixed message part, and a user dependent message part for including user dependent data in said message.

19. The system according to claim 13, wherein said administrative information comprises at least one of a group comprising terminal status, capabilities of functional access types available to said terminal, connection status of said functional access types, terminal subscription information related to services provided in said communications system, and type of payment.

* * * * *

UNITED STATES PATENT AND TRADEMARK OFFICE
CERTIFICATE OF CORRECTION

| | | |
|---|---|---|
| PATENT NO. | : 8,606,224 B2 | Page 1 of 1 |
| APPLICATION NO. | : 11/915916 | |
| DATED | : December 10, 2013 | |
| INVENTOR(S) | : Noldus et al. | |

It is certified that error appears in the above-identified patent and that said Letters Patent is hereby corrected as shown below:

In the Specification

In Column 10, Line 2, delete "table" and insert -- table. --, therefor.

In the Claims

In Column 11, Line 59, in Claim 1, delete "conditions, and" and insert -- conditions and --, therefor.

In Column 12, Line 3, in Claim 3, delete "rule combination" and
insert -- rule identifier combination --, therefor.

In Column 12, Line 12, in Claim 6, delete "claim 1" and insert -- claim 1, --, therefor.

In Column 12, Line 45, in Claim 9, delete "more said" and insert -- more of said --, therefor.

In Column 12, Line 48, in Claim 9, delete "information;" and
insert -- information changes, upon changing of said administrative information; --, therefor.

In Column 14, Line 22, in Claim 17, delete "claim 13" and insert -- claim 13, --, therefor.

Signed and Sealed this
Twenty-second Day of July, 2014

Michelle K. Lee
*Deputy Director of the United States Patent and Trademark Office*